No. 658,579. Patented Sept. 25, 1900.
W. C. PETERSON.
BAND CUTTER AND FEEDER.
(Application filed Aug. 2, 1899.)

(No Model.) 3 Sheets—Sheet 1.

No. 658,579. Patented Sept. 25, 1900.
W. C. PETERSON.
BAND CUTTER AND FEEDER.
(Application filed Aug. 2, 1899.)

(No Model.) 3 Sheets—Sheet 2.

WITNESSES: INVENTOR
  W. C. Peterson
BY
  ATTORNEYS

No. 658,579. Patented Sept. 25, 1900.
W. C. PETERSON.
BAND CUTTER AND FEEDER.
(Application filed Aug. 2, 1899.)
(No Model.) 3 Sheets—Sheet 3.

WITNESSES:

INVENTOR
BY
ATTORNEYS

UNITED STATES PATENT OFFICE.

WALFERD C. PETERSON, OF GENEVA, NEBRASKA, ASSIGNOR OF ONE-HALF TO FRANKLIN SKIPTON, OF SAME PLACE.

BAND-CUTTER AND FEEDER.

SPECIFICATION forming part of Letters Patent No. 658,579, dated September 25, 1900.

Application filed August 2, 1899. Serial No. 725,880. (No model.)

*To all whom it may concern:*

Be it known that I, WALFERD C. PETERSON, of Geneva, in the county of Fillmore and State of Nebraska, have invented a new and Improved Band-Cutter and Feeder, of which the following is a full, clear, and exact description.

The object of the invention is to so construct the band-cutting and feeding attachment for threshing-machines that the feed of the cylinder and concave will be automatically governed and of such character as to render it impossible for an excess of material to clog the cylinder, as when such a condition is likely to prevail the bundle-carrier and feed-roller employed will instantly and simultaneously stop, being automatically again set in motion as soon as the conditions are normal.

Another object of the invention is to provide knives for cutting the bands and which will have a drawing motion in direction of the cylinder and to so protect the knives that the straw will not wrap around them or their carriers.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
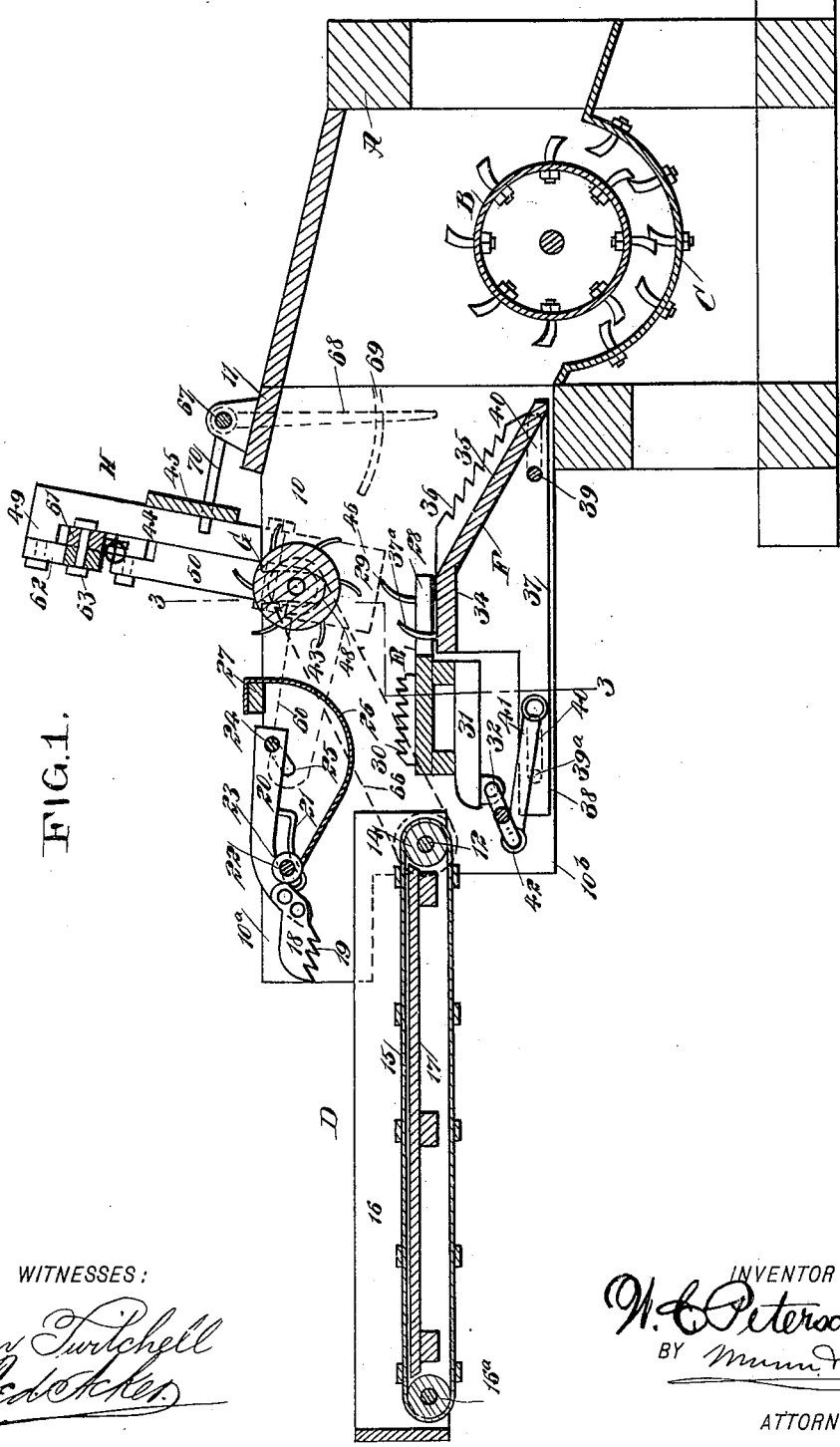
Figure 2:
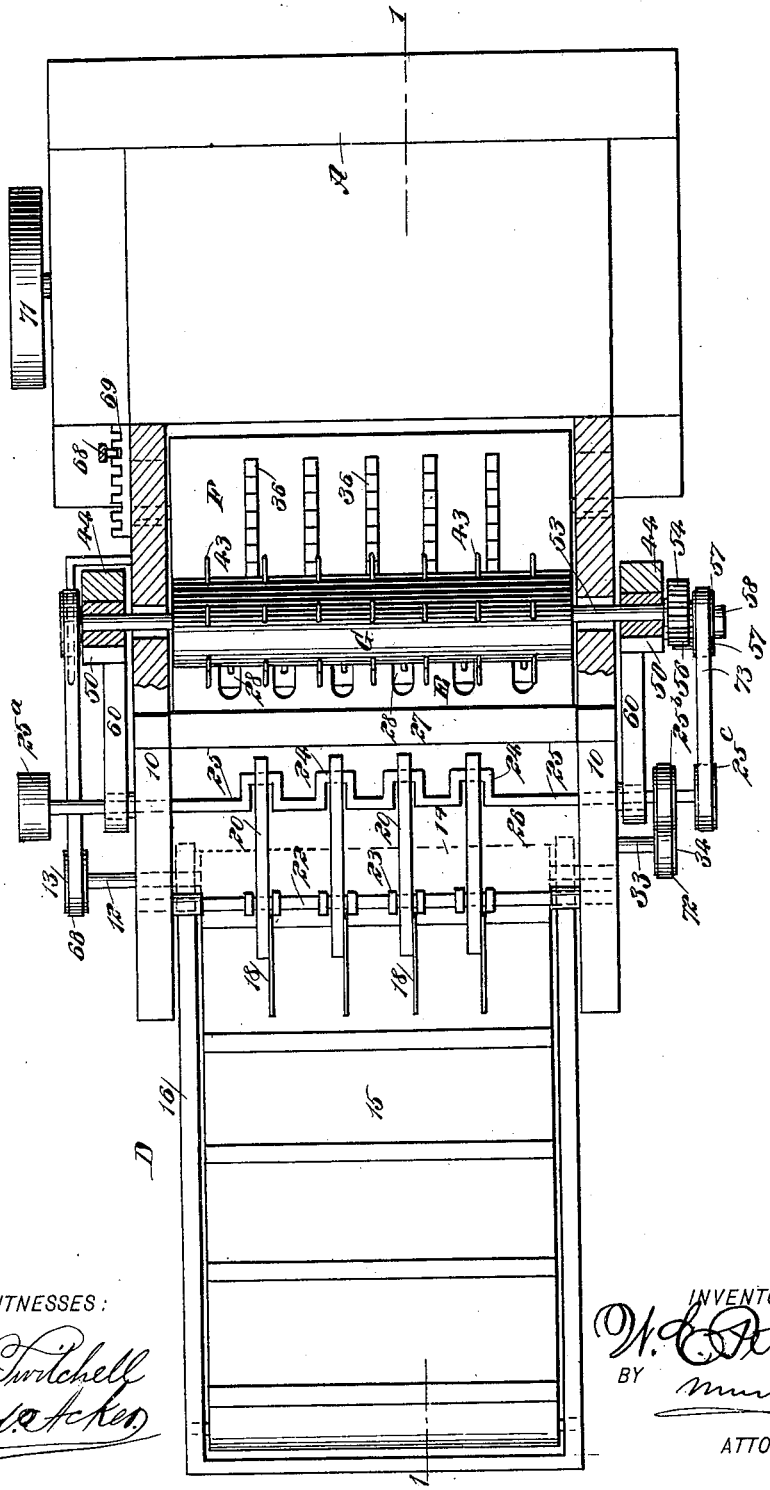
Figure 3:
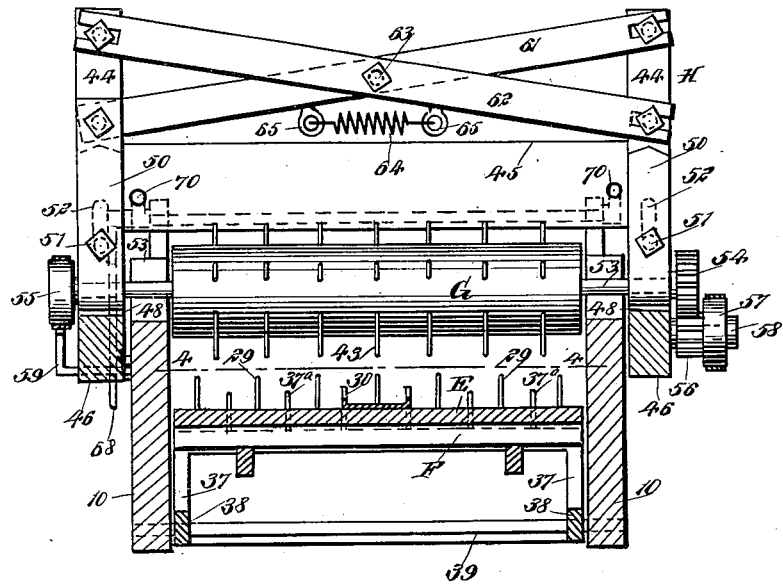
Figure 4:
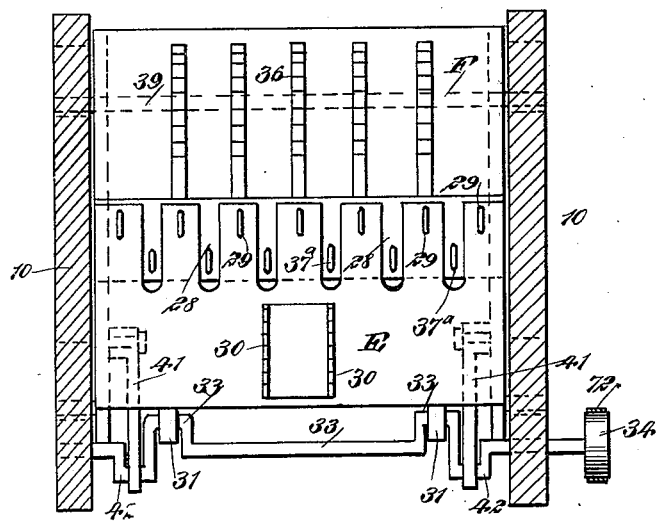

Figure 1 is a longitudinal vertical section through the device, the section being taken practically on the line 1 1 of Fig. 2. Fig. 2 is a plan view of the device, a portion of the frame being in section. Fig. 3 is a vertical section taken substantially on the line 3 3 of Fig. 1; and Fig. 4 is a horizontal section through a portion of the frame, illustrating the shaker-board and feed-board of the device in plan view, the section being on the line 4 4 of Fig. 3.

The threshing-machine A may be of any desired character, but in the drawings only that portion of the machine is illustrated in which the cylinder B and concave C are located.

The frame of the attachment consists usually of two side pieces 10, that are secured in the mouth or inlet portion of the threshing-machine, the sides being connected at the upper portion of the outlet end of the device by a suitable cross-bar 11, although other means may be provided to that end. At the receiving end of the side pieces 10 the said side pieces are recessed from a point below to a point above their centers, forming an extended upper portion 10$^a$ at the receiving end and a shorter lower section 10$^b$ at the same end, as is clearly shown in Fig. 1.

A shaft 12 is journaled in the side pieces 10 of the frame adjacent to the reduced portion 10$^b$ of the receiving end of the frame, and the said shaft 12 extends through one side of the frame and is provided at its projecting end with a pulley 13, as shown in Fig. 2. The shaft 12 is adapted to carry a drum 14, located between the sides of the frame, and said drum 14 is adapted to support one end of the endless apron 15 of a bundle-carrier D. The other end of the apron is passed over another drum 16$^a$, the shaft or trunnions whereof are journaled in the usual side pieces 16 provided for a bundle-carrier, the said frame or side pieces being connected by the ordinary supporting-platform 17, located between the stretches of the endless belt or apron 15, as shown in Fig. 1.

The bundles are cut through the medium of blades or knives 18, provided with toothed or serrated bottom edges 19, the teeth being preferably given an inclination in direction of the receiving end of the device or attachment. The shanks of the knives 18 are preferably upwardly curved, and each shank is secured to an arm 20, the ends of the arm nearest the bundle-carrier being downwardly curved, but otherwise the arms are practically straight. Each arm is provided with a guide-loop 21, located upon its bottom edge at the curved section thereof, the loops 21 following the curvature of the arms, as is also best shown in Fig. 1.

A guide-shaft 22 is passed through all of the loops 21, as the knife-carrying arms 20 are adapted to rock on this shaft, and the shaft 22 is stationarily attached at its ends in the sides 10 of the frame. The knife-carrying arms 20 are properly spaced through the medium of washers or collars 23, formed on the shaft 22, as shown in both Figs. 1 and 2. The inner ends of the knife-carrying arms 20 are pivotally attached to crank-arms 24, formed upon a shaft 25, which shaft extends from the side pieces of the frame at both of its ends, being provided at one end with a driving-pulley 25$^a$ and at its opposite end with two pulleys 25$^b$ and 25$^c$.

The guide-shaft for the knife-carrying arms and the mechanism for moving the said arms are protected by a guard 26, that extends from a cross-bar 27, located upon the top of the frame adjacent to the inner ends of the knife-carrying arms, said guard curving from thence downward and upward to a suitable engagement with the guide-shaft 22. It will be observed that as the crank-shaft 25 is operated the arms will be rocked on the guide-shaft 22 and will be given at the same time a forward and downward movement followed by an upward and rearward movement, and in this manner the knives perform effective service since they operate with a drawing motion, thus effecting a draw cut.

A shaker-board E is mounted for sliding movement within the frame between the delivery end thereof and the delivery end of the bundle-carrier, being adapted to receive the separated or cut grain from said bundle-carrier. This shaker-board E is provided at the end facing the outlet of the attachment with a series of transverse slots 28, (shown best in Fig. 4,) and teeth 29 are secured to the tongues formed by the slots, as shown in Figs. 1 and 4, the teeth being preferably curved in the direction of the delivery end of the attachment.

A series of toothed fins 30 is secured upon the upper face of the shaker-board E at that portion which is adjacent to the bundle-carrier, and cross-bars 31 are secured to the bottom portion of the shaker-board, which cross-bars extend beyond the longitudinal side of the said board that faces the receiving portion of the attachment. These cross-bars 31 are pivotally attached to crank-arms 32, formed in a shaft 33, which is suitably journaled in the side pieces of the frame, and as the shaft 33 is revolved the shaker-board is made to travel upward and in direction of the delivery end of the attachment on the cylinder and concave and return in direction of the receiving end of the attachment. The slotted end of the shaker-board E is supported upon the flat upper surface of the feed-board F, the major portion 35 of the upper surface of which feed-board inclines downwardly and outwardly in direction of the outlet end of the frame, and this feed-board is so placed in the frame that it will deliver the grain to the concave and cylinder. Toothed fins 36 are also secured upon the upper surface of the feed-board F, and said feed-board is provided with side pieces 37, having projections 38, that extend in direction of the receiving end of the frame, as shown in Fig. 1. The feed-board is adapted to be laterally reciprocated simultaneously with the corresponding movement of the shaker-board; but the two boards while moving simultaneously move in opposite directions, and the feed-board is provided with teeth 37$^a$ that extend up through the slots 28 in the shaker-board, and when the two boards are in motion these teeth serve to tear or separate the grain.

The feed-board F is guided in its movement by pins 39 near one end, which enter slots 40 made in the sides of the frame, as shown in dotted lines in Fig. 1, while at the opposite end of the frame slots 40 are likewise provided; but instead of pins 39 a rod 39$^a$ is usually employed that extends from one projection 38 of the feed-board to the other, passing likewise through the said slots 40. Motion is communicated to the feed-board through the medium of links 41, pivoted to the extensions 38 and to crank-arms 42, formed on the shaft 33, the crank-arms 42 extending in a reverse direction to the crank-arms 32, with which the shaker-board is connected.

A feed-roller G is located immediately above the point where the shaker-board E overlaps the feed-board F. This roller G is adapted to rotate in direction of the cylinder B and is provided with series of peripheral teeth 43, which teeth serve to assist in the separation of the straw, and consequently promote the feed of the straw to the concave and cylinder. The feed-roller G is journaled in a frame H and said roller is adapted to rise of its own accord when a surplus of material or too great an accumulation of material occurs and is fed from the bundle-carrier onto the shaker-board and feed-board, and when the feed-roller G thus rises it automatically stops the movement of the conveyer of the bundle-carrier, thus preventing any more material being fed to the attachment until the shaker-board and feed-board have freed themselves from the material already fed thereto, since these two parts will continue to operate even when the feed-roller G and bundle-carrier are out of operation.

The frame H is pivotally attached to the main frame 10 of the attachment and consists usually of two uprights 44, connected by a backboard 45, the base portions of said uprights being made quite wide and the base of each standard or upright is provided with a recess 48 in its upper surface, as shown in dotted lines in Fig. 1, while a projection 49 is formed in direction of the enlargement of the base at the upper end of each standard or upright 44.

A slide 50 is adapted for vertical movement between the projected portion of the base of each standard and the upper projection 49 thereof. The lower ends of these slides are adapted to fit normally in the recesses 48, and the slides are usually guided in their movements upon the standard by connecting pins 51 with the slides and passing said pins through slots 52 in the standards, as shown in dotted lines in Fig. 3. The shaft 53, to which the feed-roller G is secured, is passed through suitable recesses in the sides 10 of the main frame, and the ends of the shaft 53 are journaled in the lower portions of the slides 50, as shown best in Fig. 3. A gear 54 is secured at one end of the shaft 53, while a pulley 55 is attached at its opposite end, and the gear 54 is adapted to mesh with a pinion 56, preferably attached to a pulley 57, both pinion and pulley being mounted upon a spud-axle 58, attached to the base of one of the standards 44 of the adjustable frame H.

In order that the weight shall be equalized at each end of the shaft 53, a bracket 59 is provided, against which the pulley 55 may have bearing, as shown in Figs. 2 and 3. The adjustable frame H is usually attached to the main frame of the attachment by means of arms 60, secured to the base of the standards 44, said arms extending in direction of the receiving end of the frame of the attachment, being pivoted to the said main frame or upon the plain surface of the upper crank-shaft 24, operating the knives.

For the purpose of equalizing the movement of the slides 50, two cross-bars 61 and 62 are connected at their centers by a suitable pivot-pin 63, and each bar at one of its ends is adjustably attached to a slide 50 and at its upper end to an upright or standard 44 of the sliding frame H, preferably at the upper projection 49 of said standard, as shown in Fig. 3. The amount of pressure necessary to raise the feed cylinder or roller G can be controlled by connecting a spring 64, of suitable length, at one of its ends to the bar 62 and at its opposite end to the bar 61, the spring extending below the central portions of the bars, and usually the spring is attached to the bars by means of eyes 65 or like devices, as is also shown in Fig. 3.

The conveyer-belt 15 of the bundle-carrier is driven by connecting the pulley 13 of the driving-shaft 12 by a belt 66 with the pulley 55 on the shaft 53 of the feed-roller G, as shown in Fig. 2. The adjustable frame H may be raised bodily when desired, thus carrying both the bundle-carrier D and feed-roller G out of action, and this is accomplished by journaling a shaft 67 preferably on the cross-bar 11 of the main frame, providing said shaft with a lever 68, arranged to engage with a rack 69, and further providing the shaft with arms 70, that extend through openings in the backboard 45 of the adjustable frame H, as shown in Figs. 1 and 3.

Preferably power is taken from the driving-pulley 71 of the threshing-cylinder and conveyed by a suitable belt to the driving-pulley 25$^a$ on the upper crank-shaft 25. The lower crank-shaft 33 is driven by a belt connection 72 between the pulley 34 on the shaft 33 and the pulley 25$^b$ on the shaft 25, while the pinion 56, that meshes with the gear 54, is driven by a belt 73, extending over the pulley 57, connected with the pinion 56, and over the extreme outer pulley 25$^c$ on the upper crank-shaft 25.

In operation, all of the parts being in proper position, when bundles are placed on the bundle-carrier D they are cut by the reciprocating knives 18 and the straw is passed to the shaker-board E and thence to the feed-board F, the shaker-board E moving upward and toward the outlet of the main frame, while the feed-board moves simultaneously in a reverse direction or toward the inlet of the main frame. The same order is preserved on the return movement of the shaker-board. This movement of the two boards in opposite directions, together with the teeth on the two boards and the teeth on the rotating feed-roller G, serves to effect a complete separation of the straw, and the tendency of the straw thus separated is to move quickly down the incline of the feed-board to the concave and cylinder.

Whenever too great a mass of material accumulates between the feed-roller G and the shaker-board E and its mating board F, the the feed-roller G will move upward and be carried out of gear with its driving-pinion 56, and since the conveyer-belt of the bundle-carrier D is driven from the feed-roller G the movement of the said conveyer-belt on the bundle-carrier D will be stopped at the same time, while the shaker-board E and feed-board F will continue operating and will quickly relieve themselves from the accumulated material, whereupon the feed-roller G will drop and be again set in motion and in turn will start the conveyer-belt 15 of the bundle-carrier D.

Having thus described my invention, I claim as new and desire to secure by Letters Patent—

1. In a band-cutter and feeder, the combination with an endless bundle-carrier, of a feed-roller mounted in yielding bearings and having a pulley at one end and a gear-wheel at the other, a belt passing around the pulley of the feed-roller and a pulley on one of the drums of the endless bundle-carrier, and a driven shaft provided with a pinion, with which the gear-wheel of the feed-roller meshes, substantially as and for the purpose set forth.

2. In a band-cutter and feeder, the combination with a bundle-carrier, of a feed-roller from which the bundle-carrier is operated, yielding bearings in which the roller is mounted, an equalizing device connecting said bearings, and a driven shaft geared with the roller, substantially as described.

3. In a band-cutter and feeder, the combination with a bundle-carrier, of a frame, connected and spring-pressed slides mounted in the frame, a feed-roller mounted in the slides, means for operating the bundle-carrier from the feed-roller, and a driven shaft geared with the feed-roller, substantially as described.

4. In a band-cutter and feeder, the combination with a bundle-carrier, of a frame having sliding bearings, a feed-roller mounted in the said bearings, an equalizing and pressure-regulating device connecting said bearings, means for operating the bundle-carrier from the feed-roller, and a driven shaft geared with the feed-roller, substantially as described.

5. In a band-cutter and feeder, the combination with a bundle-carrier, of a frame having sliding bearings, a feed-roller mounted in the said bearings and having at one end a belt connection with the bundle-carrier and provided at its other end with a gear-wheel, an equalizing and tension device connecting the said bearings, and a driven shaft provided with a pinion meshing with the gear-wheel of the feed-roller, substantially as described.

6. In a band-cutter and feeder, the combination with a frame, of sliding bearings carried by the frame, a feed-roller mounted in the bearings, and means connecting the slides for equalizing the movement thereof and applying pressure thereto, substantially as described.

7. In a band-cutter and feeder, the combination with a frame, of sliding bearings in the frame, a feed-roller mounted in the bearings, and an equalizing device for the slides, consisting of cross-bars pivoted together at their centers and each having one end secured to the frame and its other end to one of the slides, substantially as described.

8. In a band-cutter and feeder, the combination with a frame, of sliding bearings in the frame, a feed-roller mounted in the bearings, and an equalizing and pressure-regulating device for said slides, consisting of two cross-bars pivoted together at their centers and each having one end secured to a slide and the other to the frame, and a spring having its ends secured to the said bars, substantially as described.

9. In a band-cutter and feeder, the combination with a pivoted frame, of sliding and spring-pressed bearings in the frame, a feed-roller mounted in the bearings, and a lever engaging the frame and by means of which the said frame may be swung upon its pivot, substantially as described.

10. In a band-cutter and feeder, the combination of a sliding toothed feed-board having an inclined front portion and a horizontal rear portion, a sliding shaker-board having its front end projecting over the horizontal rear portion of the feed-board and provided with slots through which the teeth of the said feed-board project, and means for imparting sliding movement to said boards in opposite directions, substantially as described.

11. In a band-cutter and feeder, the combination of a sliding shaker-board having a series of slots in one edge and teeth on the tongues formed by the slots, a sliding feed-board over which the slotted portion of the shaker-board projects and provided with teeth projecting into the slots of the shaker-board, and means for imparting sliding movement to the shaker-board and feed-board in opposite directions, substantially as described.

12. In a band-cutter and feeder, a shaker-board having a slotted edge and teeth on the tongues formed by said slots, and a feed-board having one portion extending beneath the slotted portion of the shaker-board, the feed-board being provided with teeth which extend up through the slots in the shaker-board, a crank-shaft having crank-arms in pairs, the arms of each pair extending in opposite directions, a connection between the corresponding arms of each pair and the shaker-board, and a link connection between the other crank-arms of each pair and the feed-board, for the purpose set forth.

WALFERD C. PETERSON.

Witnesses:
W. E. PROPST,
JOHN K. WARING.